（12）United States Patent
Sarukura et al.

(10) Patent No.: US 7,440,671 B2
(45) Date of Patent: Oct. 21, 2008

(54) OPTICAL WAVEGUIDE

(75) Inventors: Nobuhiko Sarukura, Ibaraki (JP); Ko Aosaki, Tokyo (JP); Hideki Sato, Tokyo (JP); Yoshihiko Sakane, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/750,608

(22) Filed: May 18, 2007

(65) Prior Publication Data

US 2007/0269178 A1    Nov. 22, 2007

Related U.S. Application Data

(60) Provisional application No. 60/810,136, filed on Jun. 2, 2006.

(30) Foreign Application Priority Data

May 19, 2006    (JP)    ............................. 2006-140728

(51) Int. Cl.
*G02B 6/00*    (2006.01)
*G02B 6/02*    (2006.01)

(52) U.S. Cl. ........................ 385/141; 385/129; 385/142; 385/143; 385/144; 385/145

(58) Field of Classification Search ................... 385/141
See application file for complete search history.

(56) References Cited

U.S. PATENT DOCUMENTS 5,760,139 A * 6/1998 Koike et al. .................. 525/200
6,266,475 B1 * 7/2001 Suzuki et al. ................ 385/145
6,385,380 B1 * 5/2002 Friedrich et al. ............. 385/125
6,490,400 B2 * 12/2002 Suzuki et al. ................ 385/145
6,594,431 B2 * 7/2003 Suzuki et al. ................ 385/129
2001/0028778 A1 * 10/2001 Suzuki et al. ................ 385/145
2004/0189788 A1 * 9/2004 Tanaka ........................ 347/236
2005/0237137 A1 * 10/2005 Dutta .......................... 333/246

OTHER PUBLICATIONS

R. Mendis, et al., "Plastic ribbon THz waveguides", Journal of Applied Physics, Oct. 1, 2000, vol. 88, No. 7, pp. 4449-4451.
Kanglin Wang, et al., "Guided propagation of terahertz pulses on metal wires", Optical Society of America, Sep. 2005, vol. 22, No. 9, pp. 2001-2008.
H. Han, et al., "Terahertz pulse propagation in a plastic photonic crystal fiber", Applied Physics Letters, Apr. 15, 2002, vol. 80, No. 15, pp. 2634-2636.

(Continued)

*Primary Examiner*—Frank G Font
*Assistant Examiner*—Ryan Lepisto
(74) *Attorney, Agent, or Firm*—Oblon, Spivak, McClelland, Maier & Neustadt, P.C.

(57) ABSTRACT

Materials transparent to terahertz waves are very limited, and it is difficult to obtain the required performance by selecting the material. Further, it is also difficult to search for a novel material. Therefore, by letting a known material transparent to terahertz waves have a photonic crystal structure and controlling the structure, an optical waveguide having the required properties is provided.

An optical waveguide for propagation of far-infrared radiation in the terahertz region, which optical waveguide is made of a fluorinated amorphous polymer. Particularly preferred is a polymer having a fluorinated aliphatic ring structure in its main chain, obtained by cyclopolymerization of a fluorinated monomer having at least two polymerizable double bonds.

10 Claims, 3 Drawing Sheets

Lengths (L) = 10 mm, 20 mm and 30 mm
Thickness (T) = 0.5 mm, 1.0 mm and 2.0 mm

OTHER PUBLICATIONS

Masahiro Goto, et al., "Teflon Photonic Crystal Fiber as Terahertz Waveguide", Japanese Journal of Applied Physics, 2004, vol. 43, No. 2B, pp. L317-L319.

Gilbert Diwa, et al., "Photonic-crystal-fiber pigtail device integrated with lens-duct optics for terahertz radiation coupling", Applied Physics Letters 87, 151114, 2005, 3 Pages.

* cited by examiner

OPTICAL WAVEGUIDE

This application claims priority to U.S. Provisional Patent Application No. 60/810,136, filed Jun. 2, 2006, and Japanese Patent Application No. 2006-140728, filed May 19, 2006, the disclosures of which are incorporated herein by reference in their entireties.

BACKGROUND OF THE INVENTION

1. Field of the Invention

The present invention relates to an optical waveguide for propagation of far-infrared radiation having a frequency in the vicinity of 1 THz and a wavelength in the vicinity of 300 μm, which is so-called terahertz waves.

2. Discussion of Background

Far-infrared radiation having a frequency in the vicinity of 1 THz (wavelength: 300 μm) is called terahertz waves and has attracted attention very much in recent years. Namely, by means of terahertz waves, phonons or excitons of a substance can be directly excited, whereby observation of various physical phenomena can be carried out and is expected to be prospective as a new measuring method. A terahertz spectroscopy of many biological materials or polymer materials has already been carried out.

However, in the current terahertz spectroscopy, a catoptric system employing e.g. a parabolic mirror in free space, is constituted to have a sample irradiated, in many cases. Therefore, the influence of the absorption of terahertz waves by the atmosphere is substantial, and in order to avoid such influence, the entire apparatus is put in a chamber, which is then evacuated or filled with e.g. a nitrogen gas, thus requiring a large scale set-up. Therefore, various studies have been made with respect to optical waveguides capable of propagation of terahertz waves with a low loss, or with respect to materials to be employed for such optical waveguides. Recently, those employing plastic ribbons as waveguides (Non-Patent Document 1) or those employing metal wires as optical waveguides (Non-Patent Document 2) have been reported.

Such optical waveguides are required to have a high coupling efficiency and a broad bandwidth to terahertz waves, and as one method to satisfy such requirements, a photonic crystal fiber (PCF) has been studied (Non-Patent Documents 3 and 4).

Photonic crystal has such a structure that the refractive index changes in a period shorter than the wavelength of light to be used, and light propagating therethrough is controlled by a quantum optic effect. For example, by a terahertz integrated optical system having a Teflon® PCF waveguide and a lens duct combined, as reported by Sarukura et al., it is possible to suppress a coupling loss of terahertz waves generated in the lens duct as a terahertz emitter to an extremely small level, at the time of introducing them into the Teflon PCF waveguide (Non-Patent Document 5).

However, the transmission loss of the Teflon PCF waveguide itself is relatively large, and its application is rather limited.

Non-Patent Document 1: R. Mendis and D. Grischkowsky, J. Appl. Phys. 88, 4449 (2000).

Non-Patent Document 2: K. Wang and D. Mittleman, J. Opt. Soc. Am. B 22, 2001 (2005).

Non-Patent Document 3: H. Han, H. Park, M. Cho and J. Kim, Appl. Phys. Let. 80, 2634 (2002).

Non-Patent Document 4: M. Goto, A. Quema, H. Takahashi, S. Ono, and N. Sarukura, Jpn. J. Appl. Phys. 43, L317 (2004).

Non-Patent Document 5: G. Diwa, A. Quema, E. Estacio, R. Pobre, H. Murakami, S. Ono, and N. Sarukura, Appl. Phys. Let. 87, 15114 (2005).

Presently known materials transparent to terahertz waves are very limited, and it has been difficult to obtain the required performance by selecting the material. Further, it is also difficult to search for a novel material.

SUMMARY OF THE INVENTION

Under the circumstances, it is an object of the present invention to provide a transparent material for an optical waveguide which is capable of propagating terahertz waves with a low transmission loss.

Further, it is another object of the present invention to provide an optical waveguide having the required properties by letting the transparent material for propagating terahertz waves have a photonic crystal structure and controlling the structure.

In order to solve the above-mentioned problems, the present invention provides the following.

(1) An optical waveguide for propagation of far-infrared radiation in the terahertz region, which optical waveguide is made of a fluorinated amorphous polymer.

(2) The optical waveguide according to the above (1), wherein the fluorinated amorphous polymer is a polymer having a fluorinated aliphatic ring structure in its main chain, obtained by cyclopolymerization of a fluorinated monomer having at least two polymerizable double bonds.

(3) The optical waveguide according to the above (2), wherein the fluorinated monomer having at least two polymerizable double bonds is at least one member selected from the group consisting of perfluoro(butenyl vinyl ether), perfluoro(allyl vinyl ether) and perfluoro{bis(vinyloxy)methane}.

(4) The optical waveguide according to the above (1), wherein the fluorinated amorphous polymer is a polymer having a fluorinated aliphatic ring structure in its main chain, obtained by polymerization of a monomer having a fluorinated ring structure.

(5) The optical waveguide according to the above (4), wherein the fluorinated amorphous polymer is a polymer having a fluorinated aliphatic ring structure in its main chain, obtained by polymerization of at least one member selected from the group consisting of perfluoro(2,2-dimethyl-1,3-dioxol) and perfluoro(4-methoxy-1,3-dioxol).

(6) The optical waveguide according to the above (4), wherein the fluorinated amorphous polymer is a polymer having a fluorinated aliphatic ring structure in its main chain, obtained by copolymerization of at least one member selected from the group consisting of perfluoro(2,2-dimethyl-1,3-dioxol) and perfluoro(4-methoxy-1,3-dioxol) with tetrafluoroethylene.

(7) The optical waveguide according to the above (2), wherein the fluorinated amorphous polymer is a polymer having a fluorinated aliphatic ring structure in its main chain and containing at least 20 mol % of a monomer unit having a fluorinated aliphatic ring structure based on all monomer units in the polymer having a fluorinated aliphatic ring structure.

(8) The optical waveguide according to the above (1) which has a photonic crystal structure.

(9) The optical waveguide according to the above (8), which has a flat plate shape and has a linear lattice defect region in the propagation direction of the far-infrared radiation, wherein holes are disposed in triangular configuration on both sides of the lattice defect region.

(10) The optical waveguide according to the above (1), which allows not only the far-infrared radiation but also ultraviolet to near infrared radiation to propagate.

As the material constituting the optical waveguide, it is preferred to employ a fluorinated amorphous polymer in order to prevent the attenuation by light scattering at the crystal interface.

The fluorinated amorphous polymer in the present invention is amorphous, whereby the light transmittance is high, and it is possible to prevent the attenuation by light scattering. The fluorinated amorphous polymer is preferably a fluorinated polymer having a fluorinated aliphatic ring structure, a fluorinated imide ring structure, a fluorinated triazine ring structure, a fluorinated benzoxazole structure or a fluorinated aromatic ring structure. Among such fluorinated amorphous polymers, particularly preferred is a fluorinated polymer containing as a constituting element a polymer having a fluorinated aliphatic ring structure in its main chain.

The term "having a fluorinated aliphatic ring structure in its main chain" means that at least one of carbon atoms constituting the aliphatic ring is a carbon atom in a carbon chain constituting the main chain, and a fluorine atom or a fluorine-containing group is bonded to at least some of carbon atoms constituting the aliphatic ring. The atoms constituting the ring of the aliphatic ring may include, in addition to carbon atoms, oxygen atoms or nitrogen atoms. As such a fluorinated aliphatic ring structure, a fluorinated aliphatic ether ring structure is more preferred.

The polymer having a fluorinated aliphatic ring structure is preferably one obtained by polymerizing a monomer having a fluorinated ring structure, or a polymer obtained by cyclopolymerization of a fluorinated monomer having at least two polymerizable unsaturated bonds.

As the polymer having a fluorinated aliphatic ring structure in its main chain obtained by polymerizing a monomer having a fluorinated aliphatic ring structure, a polymer having a fluorinated aliphatic ring structure in its main chain is obtainable by homopolymerizing a monomer having a fluorinated aliphatic ring structure such as perfluoro(2,2-dimethyl-1,3-dioxole), perfluoro(4-methyl-1,3-dioxole) or perfluoro(4-methoxy-1,3-dioxole), or by copolymerizing such a monomer with a radical polymerizable monomer such as tetrafluoroethylene, chlorotrifluoroethylene or perfluoro(methyl vinyl ether).

The fluorinated amorphous polymer is preferably a polymer having a fluorinated aliphatic ring structure in its main chain, obtained by polymerizing at least one member selected from the group consisting of perfluoro(2,2-dimethyl-1,3-dioxole) and perfluoro(4-methoxy-1,3-dioxole). Otherwise, it is preferably a polymer having a fluorinated aliphatic ring structure in its main chain, obtained by copolymerizing at least one member selected from the group consisting of perfluoro(2,2-dimethyl-1,3-dioxole) and perfluoro(4-methoxy-1,3-dioxole) with tetrafluoroethylene.

Further, as the polymer obtainable by cyclopolymerization of a fluorinated monomer having at least two polymerizable unsaturated bonds, a polymer having a fluorinated aliphatic ring structure in its main chain may be obtained by cyclopolymerization of e.g. perfluoro(allyl vinyl ether) or perfluoro(butenyl vinyl ether), or by copolymerizing such a monomer with a radical polymerizable monomer such as tetrafluoroethylene, chlorotrifluoroethylene or perfluoro(methyl vinyl ether).

Further, a polymer having a fluorinated aliphatic ring structure in its main chain may be obtained also by copolymerizing a monomer having a fluorinated aliphatic ring structure such as perfluoro(2,2-dimethyl-1,3-dioxole), perfluoro(4-methyl-1,3-dioxole) or perfluoro(4-methoxy-1,3-dioxole) with a fluorinated monomer having at least two polymerizable double bond, such as perfluoro(allyl vinyl ether) or perfluoro(butenyl vinyl ether).

As the polymer having a fluorinated aliphatic ring structure, one containing at least 20 mol %, particularly at least 40 mol %, of a monomer unit having a fluorinated aliphatic ring structure, based on all monomer units of the polymer having a fluorinated aliphatic ring structure, is preferred from the viewpoint of the transparency, mechanical properties, etc. Further, as the polymer having a fluorinated aliphatic ring structure, it is preferred to employ one having terminal stabilization treatment carried out by fluorinating the polymer with fluorine after its production, because the initial polymer after the polymerization may often have unstable functional groups at its terminals.

As the above polymer having a fluorinated aliphatic ring structure, one having a monomer unit selected from the following chemical formulae may, for example, be specifically exemplified. The following formulae (1) and (2) are examples of the monomer unit formed by polymerization of a monomer having a fluorinated ring structure. The following formulae (3) and (4) are examples of the monomer unit formed by cyclopolymerization of a fluorinated monomer having two polymerizable double bonds.

In the following formulae (1) to (4), each of $X_1$ to $X_{10}$ which are independent of one another, is a fluorine atom, a perfluoroalkyl group or a perfluoroalkoxy group, and some of fluorine atoms may be substituted by chlorine atoms, and some of fluorine atoms in the perfluoroalkyl group or the perfluoroalkoxy group may be substituted by chlorine atoms. The carbon number in the perfluoroalkyl group or the perfluoroalkoxy group is preferably from 1 to 5, particularly preferably 1. Z is an oxygen atom, a single bond or —OC($R_{39}R_{40}$)O—. Preferred Z is an oxygen atom.

Each of $R_1$ to $R_8$, $R_{39}$ and $R_{40}$ which are independent of one another, is a fluorine atom, a perfluoroalkyl group or a perfluoroalkoxy group, and some of fluorine atoms may be substituted by chlorine atoms, and some of fluorine atoms in the perfluoroalkyl group or the perfluoroalkoxy group may be substituted by chlorine atoms. The carbon number in the perfluoroalkyl group or the perfluoroalkoxy group is preferably from 1 to 5, particularly preferably 1. Further, $R_1$ and $R_2$, or $R_3$ and $R_4$, may together form a fluorinated aliphatic ring, and in a case where p or q is 2 or more, substituents bonded to different substituted methylene groups may likewise together form fluorinated aliphatic rings, respectively. For example, $R_1$ and $R_2$ may together represent a $C_{2-6}$ perfluoroalkylene group.

p is an integer of from 1 to 4, q is an integer of from 1 to 5, and each of s and t which are independent of each other, is an integer of from 0 to 5, provided that s+t is an integer of from 1 to 6 (provided that when Z is —OC($R_{39}R_{40}$)O—, s+t may be 0). When p, q, s or t is an integer of 2 or more, the types of substituents in the plurality of substituted methylene groups defined by such a number may be different. For example, when p is 2, two $R_1$ may be different, and two $R_2$ may likewise be different. Preferably, p is 1 or 2, and preferred q is 2. Each of s and t is preferably an integer of from 0 to 4, provided that s+t is from 1 to 4.

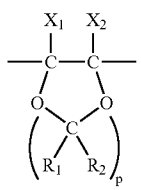

(1)

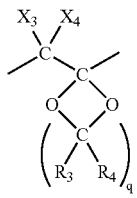

(2)

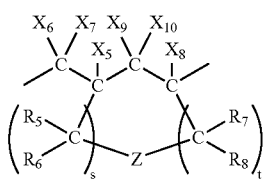

(3)

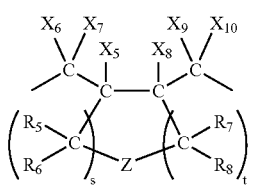

(4)

The monomer to form the monomer unit of the above formula (1) is preferably a monomer having a fluorinated aliphatic ring structure of the following formula (5) (one wherein p is 1) or a monomer having a fluorinated aliphatic ring structure of the following formula (6) (one wherein p is 2). Further, the monomer to form the monomer unit of the formula (2) is preferably a monomer having a fluorinated aliphatic ring structure of the following formula (7) (one wherein q is 2). In the following formulae, $R_9$ and $R_{11}$ are the same as the above $R_1$; $R_{10}$ and $R_{12}$ are the same as the above $R_2$; $R_{13}$ and $R_{15}$ are the same as $R_3$; and $R_{14}$ and $R_{16}$ are the same as $R_4$. Further, as mentioned above, $R_9$ and $R_{12}$, or $R_{13}$ and $R_{16}$, may together form a fluorinated aliphatic ring structure.

The compounds of the following formulae (5) to (7) are preferably compounds wherein each of $X_1$ to $X_4$ is a fluorine atom, and each of $R_1$, $R_2$, $R_9$, $R_{11}$, $R_{10}$, $R_{12}$, $R_{13}$, $R_{15}$, $R_{14}$ and $R_{16}$ which are independent of one another, is a fluorine atom, a trifluoromethyl group or a chlorodifluoromethyl group. The most preferred compound is a compound wherein each of $X_1$ and $X_2$ is a fluorine atom, and each of $R_1$ and $R_2$ is a trifluoromethyl group (i.e. perfluoro(2,2-dimethyl-1,3-dioxole)).

Further, a compound wherein $X_1$ is a fluorine atom, $X_2$ is a trifluoromethoxy group, and each of $R_1$ and $R_2$ is a fluorine atom (i.e. perfluoro(4-methoxy-1,3-dioxole)) is also preferred.

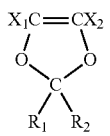

(5)

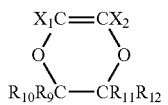

(6)

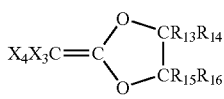

(7)

The following compounds may be mentioned as specific examples of the compounds of the above formulae (5) to (7):

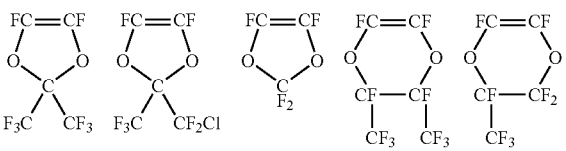

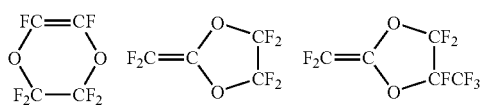

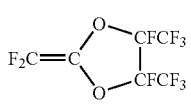

The fluorinated monomer having two polymerizable double bonds to form the monomer unit of the formula (3) or (4) by cyclopolymerization may, for example, be a monomer having a fluorinated aliphatic ring structure of the following formula (8). The compound of the formula (8) is preferably a compound wherein Z is an oxygen atom or —OC($R_{39}R_{40}$)O—, s is 0 or 1, t is from 0 to 4, provided that s+t is from 1 to 4 (provided that it may be 0 when Z is —OC($R_{39}R_{40}$)O—), each of $X_5$ to $X_{10}$ is a fluorine atom, or up to two of them are chlorine atoms, trifluoromethyl groups or chlorodifluoromethyl groups, and others are fluorine atoms, and each of $R_5$ to $R_8$, $R_{39}$ and $R_{40}$ which are independent of one another is a fluorine atom, a chlorine atom (provided that at most one bonded per a carbon atom), a trifluoromethyl group or a chlorodifluoromethyl group.

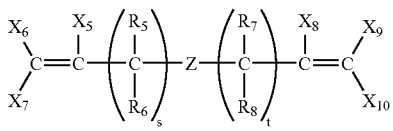
(8)

The compound of the above formula (8) is preferably compounds of the following formulae (9) to (11). The compound of the following formula (9) is a compound of the formula (8) wherein Z is —OC($R_{39}R_{40}$)O—, and each of s and t is 0; the compound of the following formula (10) is a compound of the formula (8) wherein Z is an oxygen atom, s is 0 and t is 2; and the compound of the formula (11) is a compound of the formula (8) wherein Z is an oxygen atom, s is 0 and t is 1.

In the compound of the formula (9), it is preferred that each of $X_5$ to $X_{10}$ is a fluorine atom, or one or two thereof (provided that at most 1 of $X_5$ to $X_7$, and at least one of $X_8$ to $X_{10}$) are chlorine atoms, and others are fluorine atoms. It is preferred that each of $R_{39}$ and $R_{40}$ is a fluorine atom, or one is a chlorine atom or a trifluoromethyl group, and the other is a fluorine atom. The most preferred compound of the formula (9) is a compound wherein each of $X_5$ to $X_{10}$, $R_{39}$ and $R_{40}$ is a fluorine atom (i.e. perfluoro{bis(vinyloxy)methane}).

In the compound of the formula (10), it is preferred that each of $X_5$ to $X_{10}$ is a fluorine atom, or one or two thereof (provided that at most one of $X_5$ to $X_7$, and at most one of $X_8$ to $X_{10}$) are chlorine atoms, and others are fluorine atoms. It is preferred that each of $R_{17}$, $R_{18}$, $R_{19}$ and $R_{20}$ is a fluorine atom, or at most two thereof are chlorine atoms or trifluoromethyl groups, and others are fluorine atoms. The most preferred compound of the formula (10) is a compound wherein each of $X_5$ to $X_{10}$, $R_{17}$, $R_{18}$, $R_{19}$ and $R_{20}$ is a fluorine atom (i.e. perfluoro(butenyl vinyl ether)).

In the compound of the formula (11), it is preferred that each of $X_5$ to $X_{10}$ is a fluorine atom, or one or two thereof (provided that at most one of $X_5$ to $X_7$, and at most one of $X_8$ to $X_{10}$) are chlorine atoms, and others are fluorine atoms. It is preferred that each of $R_7$ and $R_8$ is a fluorine atom, or one of them is a chlorine atom or a trifluoromethyl group, and the other is a fluorine atom. The most preferred compound of the formula (9) is a compound wherein each of $X_5$ to $X_{10}$, $R_7$ and $R_8$ is a fluorine atom (i.e. perfluoro(allyl vinyl ether)).

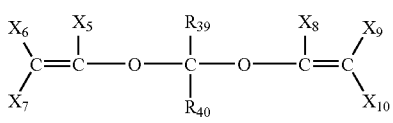
(9)

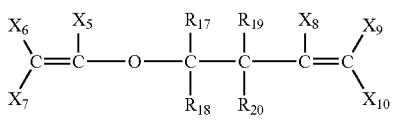
(10)

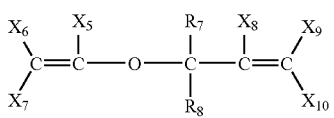
(11)

The following compounds may, for example, be mentioned as specific examples of the compounds of the above formulae (9) to (11).

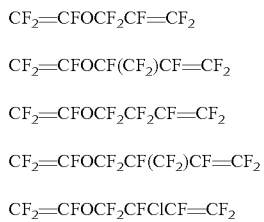

$CF_2$=$CFOCF_2CF$=$CF_2$ $CF_2$=$CFOCF(CF_2)CF$=$CF_2$ $CF_2$=$CFOCF_2CF_2CF$=$CF_2$ $CF_2$=$CFOCF_2CF(CF_2)CF$=$CF_2$ $CF_2$=$CFOCF_2CFClCF$=$CF_2$ $CF_2$=$CFOCCl_2CF_2CF$=$CF_2$ $CF_2$=$CFOCF_2CF_2CCl$=$CF_2$ $CF_2$=$CFOCF_2CF_2CF$=$CFCl$ $CF_2$=$CFOCF_2CF(CF_2)CCl$=$CF_2$ $CF_2$=$CFOCF_2OCF$=$CF_2$ $CF_2$=$CFOC(CF_2)_2OCF$=$CF_2$ $CF_2$=$CFOCCl_2OCF$=$CF_2$ $CF_2$=$CClOCF_2OCCl$=$CF_2$

The above-mentioned fluorinated monomer having at least two polymerizable double bonds is preferably at least one member selected from the group consisting of perfluoro (butenyl vinyl ether), perfluoro(allyl vinyl ether) and perfluoro{bis(vinyloxy)methane}.

More specific examples of the fluorinated amorphous polymer include CYTOP® of Asahi Glass Company, Limited), Teflon AF® of DuPont), those disclosed in U.S. Pat. No. 6,936,668B2, fluorinated perylene, fluorinated polyimide and fluorinated benzoxazole. Particularly, the fluorinated amorphous polymer is preferably a polymer having a fluorinated aliphatic structure in its main chain, and a perfluoro polymer is more preferred. The most preferred polymer having a fluorinated aliphatic structure in its main chain is CYTOP® commercially available from Asahi Glass Company, Limited.

Due to the amorphous (non-crystalline) characteristics which are entirely different from conventional crystalline fluororesins (plastics), CYTOP is a polymer having a very high transparency with a transmittance of at least 95% in a range of from 200 nm to 2 μm and with very low scattering loss. Further, it is known to be transparent also in the terahertz region. It is an object of the present invention to realize a terahertz optical waveguide with less transmission loss by letting this material called CYTOP transparent to terahertz waves have the PPCW structure which will be described below, and thereby to contribute to high performance and efficiency of measuring systems such as terahertz spectroscopy.

A planar photonic crystal waveguide (PPCW) is a photonic crystal having a periodic structure in the propagation direction of light, and its propagation mechanism is different from PCF having a periodic structure in the cross section perpendicular to the propagation direction of light. As is different from other common optical waveguides, it is capable of changing the dispersion substantially by controlling the period of refractive index. Namely, PPCW has many parameters which can be controlled, such as the period of the change in refractive index prepared in crystal, the thickness and the length, whereby it is easy to control the dispersion or other optical characteristics. Therefore, it is possible to provide an optical waveguide which is capable of propagation with low loss and high efficiency over a broad range from ultraviolet to near infrared radiation to far-infrared radiation.

The present invention is effective to provide an optical waveguide which is capable of propagating far-infrared radiation in the terahertz region with low loss and high efficiency.

DETAILED DESCRIPTION OF THE PREFERRED EMBODIMENTS

Now, the present invention will be described in further detail.

PPCW is one having an internal structure imparted so that the refractive index which the electromagnetic waves propagating in the interior will receive, changes periodically along the propagation. A CYTOP PPCW prepared in the present invention is one having holes with a diameter of 0.5 mm disposed in triangular configuration in a flat plate of CYTOP. The portion constituting the core is a portion corresponding to one row where no such holes are formed, and the perforated portions on both sides thereof constitute the clad.

In an actual preparation process, CYTOP (perfluorobutenyl vinyl ether polymer) was dissolved in perfluorooctane to obtain a 9 mass % solution, which was subjected to microfiltration by means of 0.2 μm filter. 250 g of such a CYTOP solution (CTL-109SP2, manufactured by Asahi Glass Company, Limited) was charged into a cast mold (100 L×50 W×50 H) made of glass, heated at 90° C. for 24 hours in a hot air-circulation system oven, and then heated at 100° C. for 168 hours to remove the solvent. At the stage where the solvent was substantially evaporated, reflow treatment was carried out at 250° C. for 24 hours, followed by gradual cooling to obtain a CYTOP plate having a thickness of 2 mm. Further, in the same manner, plates having thicknesses of 1 mm and 0.5 mm were prepared by changing the amount of the solution charged to 125 g and 60 g, respectively.

Figure 1:
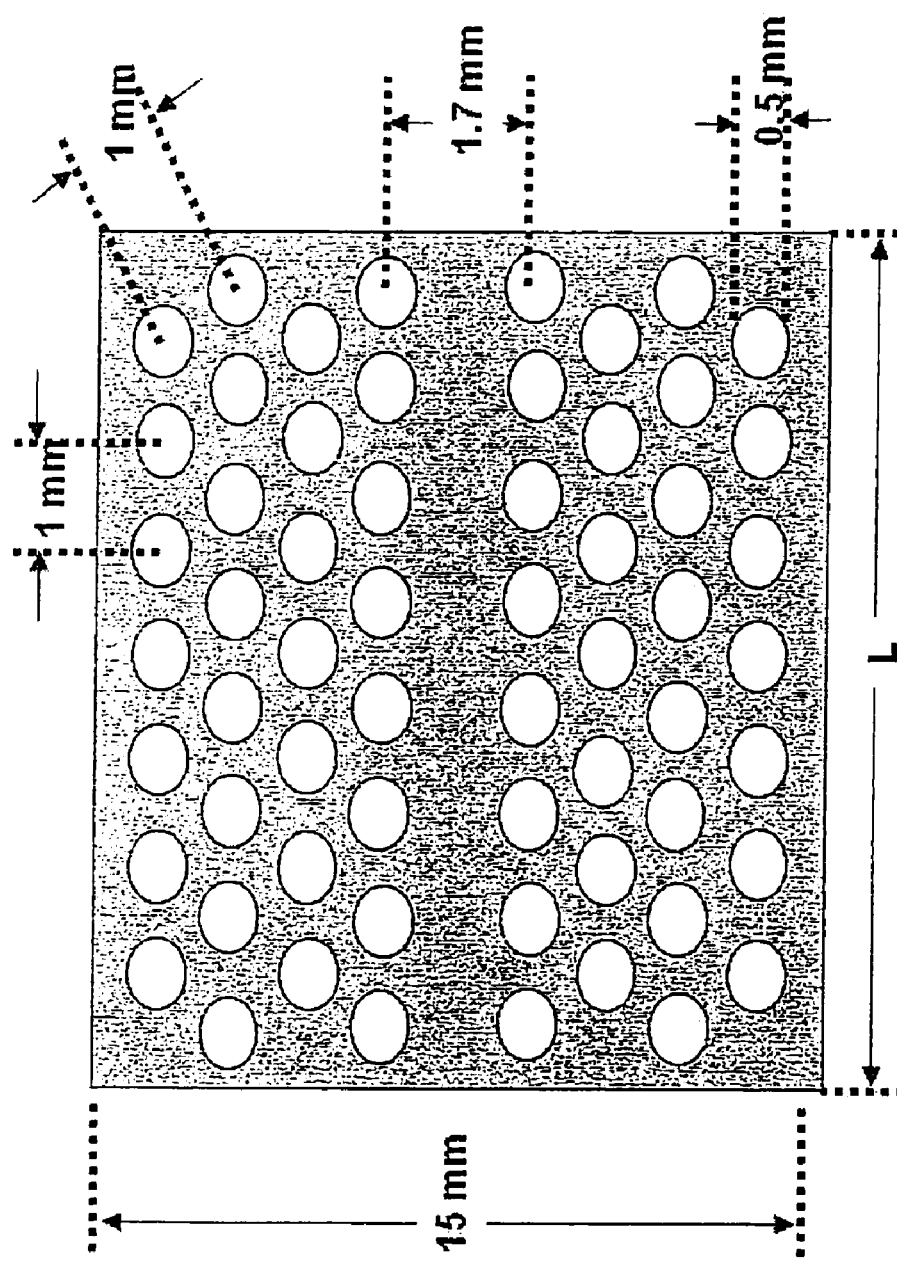
FIG. 1 is a schematic view of a planar photonic crystal optical waveguide made of CYTOP, prepared by the present invention.

Each plate thus prepared was subjected to drilling by an NC drill to form holes with a diameter of 0.5 mm in the allocation as shown in FIG. 1, to prepare a waveguide structure, and then cut into sizes of 10 mm in width and 10, 20 and 30 mm in length by a dicing saw, to obtain PPCW.

FIG. 1 shows its schematic view, and the width of the core is 1.732 mm as the center distance of the holes on both sides. The sample used for the experiment was such that the length was 10, 20 or 30 mm, and the thickness was 0.5 or 1.2 mm. The real part and the imaginary part of the refractive index at from 0.3 to 1.2 THz, obtained by the experiment, were 1.4 and $1.85\times10^{-3}$, respectively.

Figure 2:
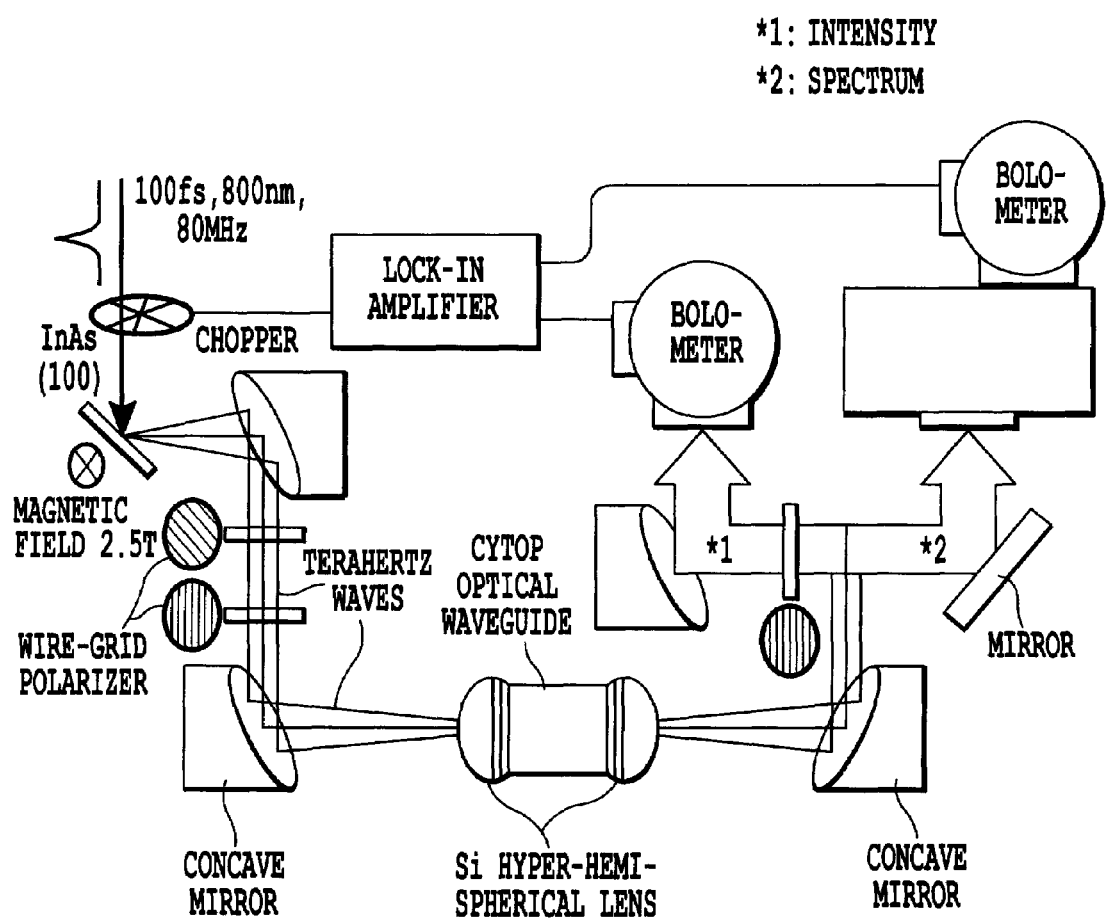
FIG. 2 is a schematic view of a measuring system to evaluate a sample prepared.

FIG. 2 is a layout drawing of the experiment. The ultrashort pulses to be output from a mode-synchronized titanium sapphire laser of an excitation light source have a pulse width of 100 fs, a frequency of 82 MHz, an average output of 0.79 W and a center wavelength of 800 nm, and they are permitted to enter into an indium arsenic (InAs) substrate to generate terahertz waves. Further, in order to increase the output of terahertz waves, a magnetic yield of 2.5 T is applied to the substrate. The generated terahertz waves are collected by an off-axis paraboloidal mirror and introduced into an optical waveguide. For coupling of terahertz waves to the optical waveguide, the optical waveguide is provided with a hyper-hemispheric lens made of silicon (Si), and the same hyper-hemispheric lens is also provided on the output side of the optical waveguide in order to increase the output efficiency of the terahertz waves. The output and spectrum of the terahertz waves transmitted through the optical waveguide are measured, respectively, by means of a germanium-bolometer cooled with liquid helium and a polarized Michelson interferometer.

Figure 3:
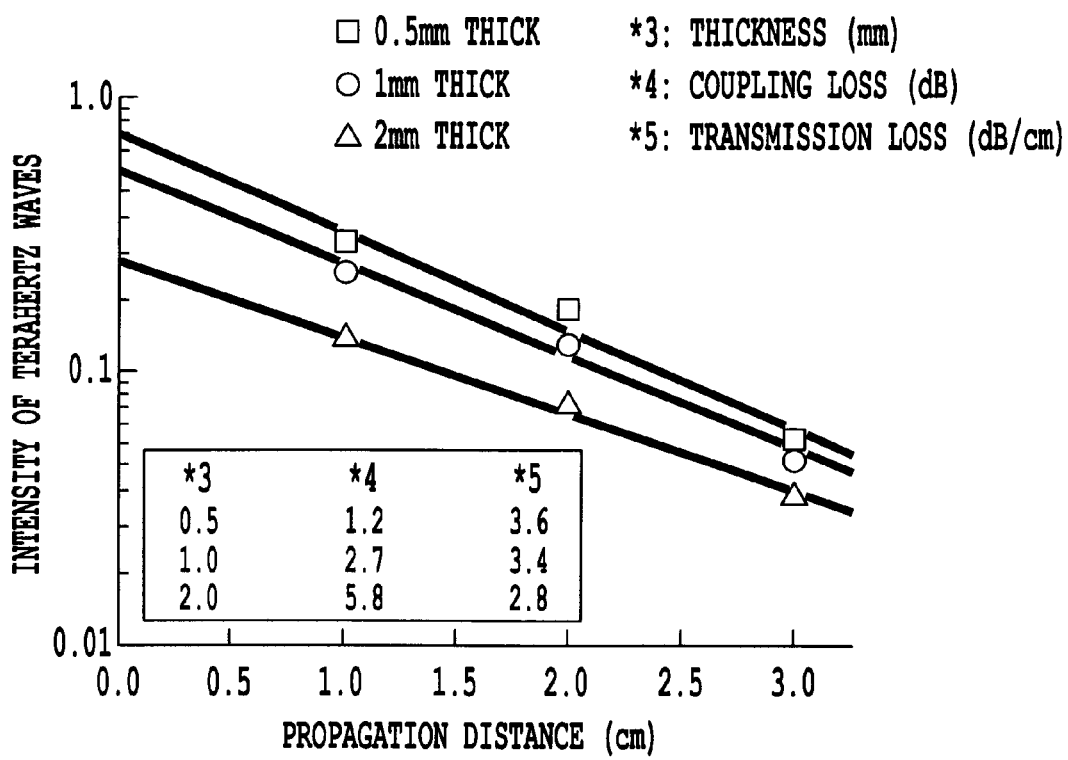
FIG. 3 is a graph showing the intensity of terahertz waves transmitted through the sample.

FIG. 3 is a graph obtained by plotting the output of terahertz waves transmitted through PPCW. The abscissa represents the propagation distance (length of CYTOP PPCW), and the ordinate represents the output of terahertz waves by a logarithmic axis. Measurements were carried out with respect to a total of nine types of samples i.e. three types of thickness (0.5 mm, 1 mm and 2 mm) and three types of length (1.0 cm, 2.0 cm and 3.0 cm). The linear line in the Fig. represents fitting with a linear line on the results of measurement of samples having the same thickness, and it shows that the intensity of terahertz waves attenuates exponentially relative to the propagation distance. By extraporating this linear fitting, the coupling loss between the CYTOP PPCW and the Si hyper-hemispheric lens was obtained, and the transmission loss was obtained from the inclination of the linear line. The results are shown in the Table in FIG. 3.

From the Table, it is evident that the coupling loss increases as the thickness of the sample increases, and on the other hand, the transmission loss decreases as the propagation distance increases. The transmission loss corresponds to absorption by the medium and leakage of terahertz waves into the atmosphere. These results indicate that when the thickness of the sample is 0.5 mm, the coupling loss is smallest in the allowable range of the transmission loss. Namely, a thinner waveguide is capable of transmitting terahertz waves having higher intensity. The transmission loss of CYTOP is superior at a level of about one third of the transmission loss (0.92 dB/mm of Teflon® (Non-Patent Document 4). Further, as is different from Teflon® which permits no transmission of the ultraviolet to near infrared region, CYTOP which is transparent in the deep ultraviolet region of about 200 nm to the near infrared region and in the terahertz region, is capable of realizing a hybrid optical system which can simultaneously handle lights of totally different wavelength regions i.e. the visible region and the terahertz region, by a single device.

Figure 4:
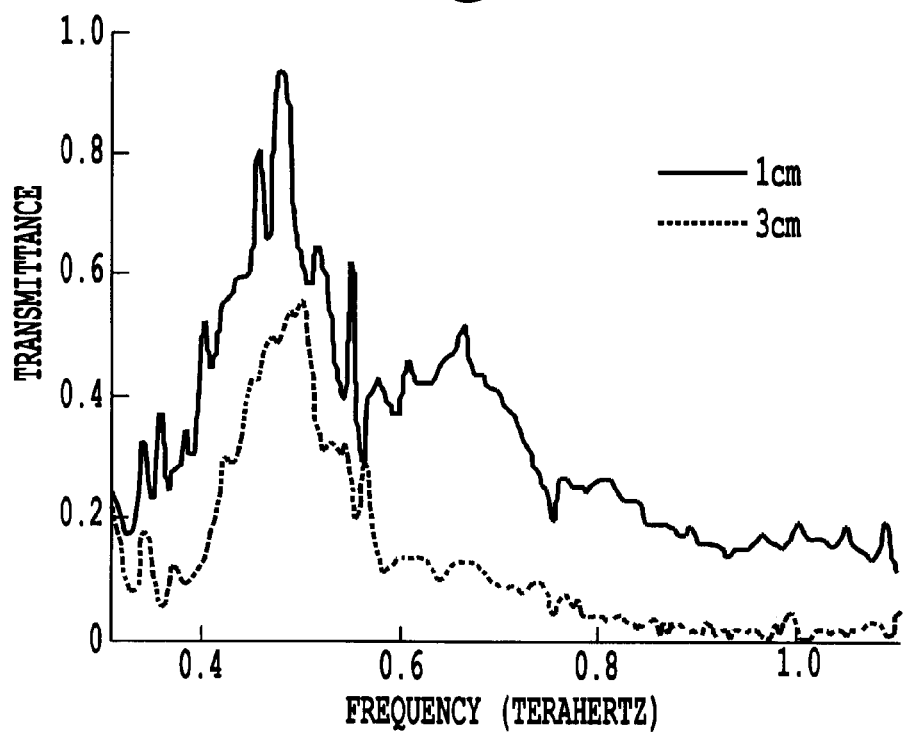
FIG. 4 is a graph showing the spectrum of terahertz waves transmitted through the sample.

FIG. 4 shows the transmission spectra of samples having a thickness of 0.5 mm and lengths of 1 cm and 3 cm. The sample having a length of 1 cm had a transmittance of about 94%, and the sample of 3 cm had a transmittance of about 56%, thus showing very high transmittances. These are results expected from the fact that the coupling loss and the transmission loss of such samples were relatively small. On the other hand, as is evident from the graph, with these samples, the absorption of a high frequency component is larger than the low frequency component of terahertz waves. The absorption coefficient at 1 THz obtained by the experiment was 0.78 cm$^{-1}$, whereas the absorption coefficient at 0.4 THz was 0.25 cm$^{-1}$.

According to the present invention, propagation of far-infrared radiation in the terahertz region becomes possible with low loss and high efficiency, and it becomes possible to easily realize various terahertz measuring systems such as spectrophotometer not susceptible to an influence by absorption by the atmosphere. Further, not only the far-infrared radiation, but also radiation in the ultraviolet to near infrared region may be transmitted, and thus it is possible to realize a hybrid optical system which can handle lights in different wavelength regions simultaneously by one device.

What is claimed is:

1. An optical waveguide for propagation of far-infrared radiation in the terahertz region, wherein the optical waveguide comprises a fluorinated amorphous polymer having a fluorinated aliphatic ring structure in its main chain.

2. The optical waveguide according to claim 1, wherein the fluorinated amorphous polymer having a fluorinated aliphatic ring structure in its main chain is obtained by cyclopolymerization of a fluorinated monomer having at least two polymerizable double bonds.

3. The optical waveguide according to claim 2, wherein the fluorinated monomer having at least two polymerizable double bonds is at least one member selected from the group consisting of perfluoro(butenyl vinyl ether), perfluoro(allyl vinyl ether) and perfluoro{bis(vinyloxy)methane}.

4. The optical waveguide according to claim 2, wherein the fluorinated amorphous polymer having a fluorinated aliphatic ring structure in its main chain comprises at least 20 mol % of a monomer unit having a fluorinated aliphatic ring structure based on all monomer units in the polymer having a fluorinated aliphatic ring structure.

5. The optical waveguide according to claim 1, wherein the fluorinated amorphous polymer having a fluorinated aliphatic ring structure in its main chain is obtained by polymerization of a monomer having a fluorinated ring structure.

6. The optical waveguide according to claim 5, wherein the fluorinated amorphous polymer having a fluorinated aliphatic ring structure in its main chain is obtained by polymerization of at least one member selected from the group consisting of perfluoro(2,2-dimethyl-1,3-dioxole) and perfluoro(4-methoxy-1,3-dioxole).

7. The optical waveguide according to claim 1, wherein the fluorinated amorphous polymer having a fluorinated aliphatic ring structure in its main chain is obtained by copolymerization of at least one member selected from the group consisting of perfluoro(2,2-dimethyl-1,3-dioxole) and perfluoro(4-methoxy-1,3-dioxole) with tetrafluoroethylene.

8. The optical waveguide according to claim 1, which has a photonic crystal structure.

9. The optical waveguide according to claim 8, which has a flat plate shape and has a linear lattice defect region in the propagation direction of the far-infrared radiation, wherein holes are disposed in triangular configuration on both sides of the lattice defect region.

10. The optical waveguide according to claim 1, which allows not only the far-infrared radiation but also ultraviolet to near infrared radiation to propagate.

* * * * *